United States Patent [19]

Kugimiya et al.

[11] Patent Number: 5,075,851
[45] Date of Patent: Dec. 24, 1991

[54] SYSTEM FOR TRANSLATING A SOURCE LANGUAGE WORD WITH A PREFIX INTO A TARGET LANGUAGE WORD WITH MULTIPLE FORMS

[75] Inventors: Shuzo Kugimiya; Ichiko Sata, both of Nara; Tokuyuki Hirai, Yamatokoriyama; Yoji Fukumochi; Hitoshi Suzuki, both of Nara, all of Japan

[73] Assignee: Sharp Kabushiki Kaisha, Osaka, Japan

[21] Appl. No.: 549,944

[22] Filed: Jul. 9, 1990

[30] Foreign Application Priority Data

Jul. 12, 1989 [JP] Japan .................................. 1-180764

[51] Int. Cl.$^5$ ............................................. G06F 15/20
[52] U.S. Cl. ..................................... 364/419; 395/144
[58] Field of Search .................. 364/419, 226.4, 920.4

[56] References Cited

FOREIGN PATENT DOCUMENTS

0109572 of 1988 Japan .

Primary Examiner—Gail O. Hayes

[57] ABSTRACT

A translating apparatus includes: a prefix table for storing a prefix and a plurality of translated words of the prefix such that the translated words of the prefix are, respectively, composed of different kinds of characters of a target language. There is in the apparatus a prefix decision device for deciding whether or not one of morphemes obtained by a morphological analysis portion is a basic word combined with the prefix. The apparatus also has a character discriminating device for discriminating, in the case where it has been decided by the prefix decision device that the one of the morphemes obtained by the morphological analysis portion is the basic word combined with the prefix, a kind of characters of a translated word of the basic word. In addition there is a prefix translating device in the apparatus for generating one of the translated words of the prefix from the prefix table such that the one of the translated words of the prefix is composed of characters of the same kind as that of the characters of the translated word of the basic word, which has been discriminated by the character discriminating device.

2 Claims, 7 Drawing Sheets

Input (This is a pen.)

- Buffer A

| t | h | i | s | | | | |
|---|---|---|---|---|---|---|---|
| i | s | | | | | | |
| a | | | | | | | |
| p | e | n | | | | | |
| | | | | | | | |

Fig. 7

- Buffer B

| | | |
|---|---|---|
| this — — | Pronoun | Demonstrative adjective |
| is — — | Verb | |
| a — — | Article | |
| pen — — | Noun | |

Fig. 8

• Buffer C

Fig. 9

• Buffer D

Fig. 10

• Buffer E

Output これはペンである。

Fig. 11

| Prefix | Translation in "katakana" | Translation in "kanji" |
|--------|--------------------------|------------------------|
| ... | ... | ... |
| anti- | アンチ | 反 |
| mid- | ミッド | 真中の |
| over- | オーバー | 過度の |
| super- | スーパー | 超 |
| ... | ... | ... |

Fig. 13

Input: supercomputer
Output: スーパーーコンピュータ

Fig. 14

Buffer B

| | Part of speech | Translated word | Prefix flag | Prefix |
|---|---|---|---|---|
| computer-- | Noun | コンピュータ | 1 | super- |
| | | | | |

Fig. 12

SYSTEM FOR TRANSLATING A SOURCE LANGUAGE WORD WITH A PREFIX INTO A TARGET LANGUAGE WORD WITH MULTIPLE FORMS

BACKGROUND OF THE INVENTION

The present invention relates to a translating apparatus which is capable of generating a natural translated sentence.

In known translating apparatuses, a source language inputted from a keyboard is inputted to a translation module by control of a main CPU. The inputted source language is translated into a target language by the translation module through utilization of a dictionary, grammatical rules and tree structure conversion rules stored in a memory. At this time, a prefix present in the source language is translated by using its single translated word contained in the above mentioned dictionary. Meanwhile, when a translated sentence of the source language, including a word composed of the prefix, and a basic word to be combined with the prefix is outputted, a translated word of the prefix and a translated word of the basic word are outputted successively.

Figure 1:
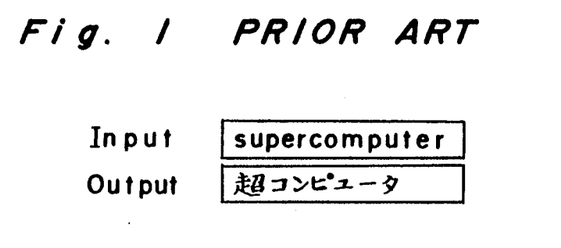
FIG. 1 is a view showing an example of an input sentence and an output sentence in a prior art translating apparatus (already referred to)

As described above, in the known translating apparatuses, the prefix present in the source language is translated by using the single translated word contained in the dictionary. Therefore, in the case where the dictionary contains, for example, only a Chinese character ("kanji" in Japanese) " " as a translated word of a prefix "super-", an inputted word "supercomputer" in the source language is translated into an unnatural Japanese word " " which is not in common use as shown in FIG. 1. This unnaturalness of the translated word " " is caused by the fact that the translated word " " is constituted by combination of the Chinese character " " and square Japanese letters ("katakana" in Japanese) " " in contrast with a natural translated word " " which is wholly composed of square Japanese letters.

Meanwhile, in a case where an ordinary word whose translated word is registered in the dictionary is translated, the obtained translated word does not become as unnatural if the registered translated word is proper. However, when the basic language combined with the prefix is translated, such a case may happen in which combination of the translated word of the prefix and the translated word of the basic word is not natural even if a proper translated word of the prefix is registered in the dictionary. Thus, when the translated sentence is checked, it is necessary to carefully check especially the translated word of the basic word combined with the prefix.

However, in known translating apparatuses, when the translated word of the basic word combined with the prefix is outputted, the translated word of the prefix and the translated word of the basic word ar outputted merely successively. Hence, it is not clear whether the translated word " " is obtained by looking up the single inputted word "supercomputer" in the dictionary or by looking up the basic word "computer" in the dictionary and processing of the prefix "super-", thereby resulting in inconvenient checkup of the translated sentence.

SUMMARY OF THE INVENTION

Accordingly, an essential object of the present invention is to provide a translating apparatus which outputs, when a prefix present in a source language is translated, its translated word composed of characters of the same kind as that of characters forming a translated word of a basic word to be combined with the prefix or is capable of outputting a translated sentence indicating that the translated word of the prefix has been obtained by processing of the prefix.

In order to accomplish this object of the present invention, there is provided a translating apparatus according to the present invention, including a morphological analysis portion for not only dividing an inputted sentence of a source language into morphemes but obtaining translated words of the morphemes by using a dictionary. There is a syntactic analysis portion for analyzing, by using the dictionary and grammatical rules, structure of a sequence of the morphemes divided by said morphological analysis portion. A converter is provided for converting the structure of the inputted sentence obtained by said syntactic analysis portion into a structure of a translated sentence of a target language. A translated sentence generator is used for generating the translated sentence in accordance with the structure of the translated sentence obtained by said converter. The improvement includes a prefix table for storing a prefix and a plurality of translated words of the prefix such that the translated words of the prefix are, respectively, composed of different kinds of characters of the target language. Also in the improvement are the following: a prefix decision means for deciding whether or not one of the morphemes obtained by said morphological analysis portion is a basic word combined with the prefix; a character discriminating means for discriminating, in the case where it has been decided by said prefix decision means that the one of the morphemes obtained by said morphological analysis portion is the basic word combined with the prefix, a kind of characters of a translated word of the basic word; and a prefix translating means for generating one of the translated words of the prefix from said prefix table such that the one of the translated words of the prefix is composed of characters of the same kind as that of the characters of the translated word of the basic word, which has been discriminated by said character discriminating means.

Furthermore, it is desirable that the translating apparatus is provided with a a symbol generating means for generating, in the case where the one of the translated words of the prefix has been generated by said prefix translating means, a symbol indicating that the one of the translated words of the prefix has been generated by said prefix translating means, so as to add the symbol to a translated word of a combined word consisting of the basic word and the prefix.

When a sentence is inputted to the morphological analysis portion, the inputted sentence is divided into a sequence of morphemes and translated words of the morphemes, etc. are obtained. Thus, when the inputted sentence is divided into the sequence of the morphemes, structure of the sequence of the morphemes is analyzed by the syntactic analysis portion. Subsequently, the structure of the sequence of the morphemes obtained by the syntactic analysis portion is converted into structure of the target language by the converter such that a translated sentence is generated by the translated sentence generator in accordance with the obtained structure of the target language.

At this time, it is decided by the prefix decision means whether or not one of the morphemes inputted from the converter is the basic word combined with the prefix. As a result, if it is decided by the prefix decision means that one of the morphemes inputted from the converter is the basic word combined with the prefix, a kind of the characters of the translated word of the basic word is discriminated by the character discriminating means. Thus, one of the translated words of the prefix is generated from the prefix table by the prefix translating means such that the one of the translated words of the prefix is composed of characters of the same kind as that of the translated word of the basic word, which has been discriminated by the character discriminating means. Accordingly, in the case where the basic word combined with the prefix has been inputted, the kind of the characters of the translated word of the prefix is made identical with that of the translated word of the basic word.

Meanwhile, the translating apparatus may be provided with the symbol generating means for generating, in the case where the translated word of the prefix has been generated by the prefix generating means, the symbol indicating that the translated word of the prefix has been generated by the prefix translating means, so as to add the symbol to the translated word of the combined word consisting of the basic word and the prefix. Thus, by referring to the symbol, the translated word of the prefix generated by the prefix translating means can be discriminated from others which are not generated by the prefix translating means.

BRIEF DESCRIPTION OF THE DRAWINGS

This object and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 2:
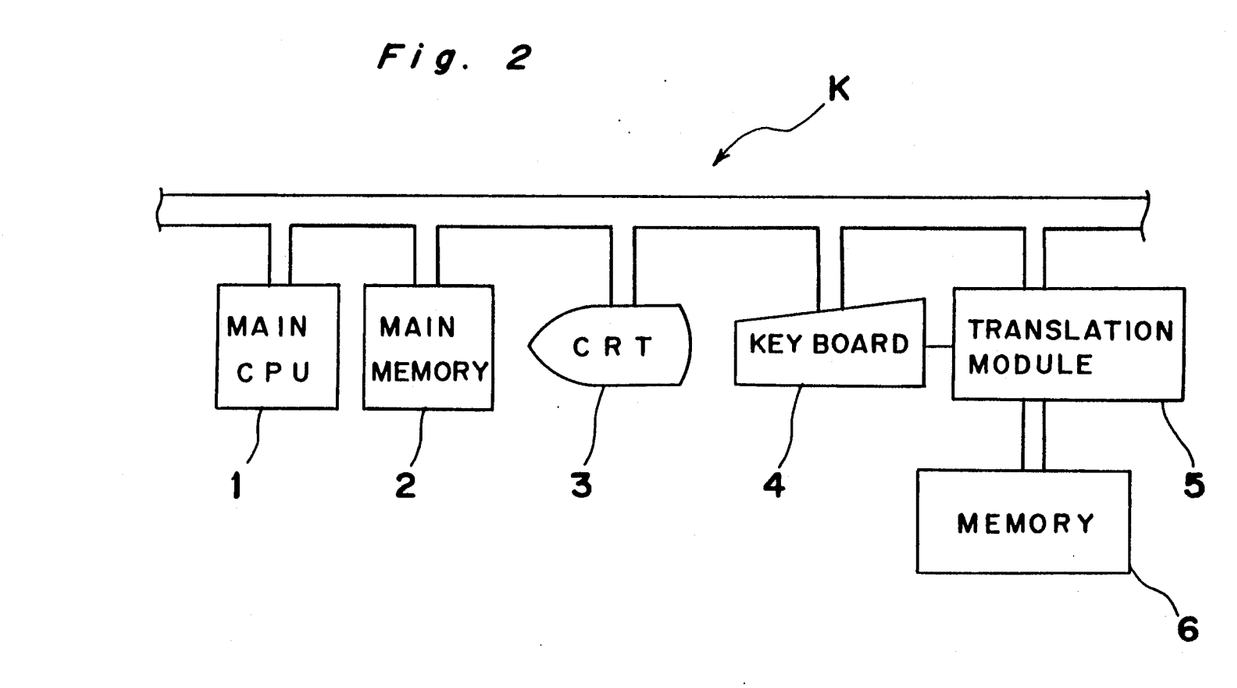
FIG. 2 is a block diagram of a translating apparatus according to one embodiment of the present invention.

Referring now to the drawings, there is shown in FIG. 2, a translating apparatus K according to one embodiment of the present invention. The translating apparatus K includes a main CPU (central processing unit) 1, a main memory 2, a CRT (cathode-ray tube) 3, a keyboard 4, a translation module 5 and a memory 6 for storing a dictionary, grammatical rules, tree structure conversion rules, etc. for translation.

The translation module 5 is provided for translating an inputted source language into a target language so as to output the target language. Namely, the source language inputted from the keyboard 4 is transmitted to the translation module 5 under control of the main CPU 1. By using the dictionary, the grammatical rules, the tree structure conversion rules, etc. stored in the memory 6, the translation module 5 translates the inputted source language into the target language as will be described in detail. The translated result is not only temporarily stored in the main memory 2 but displayed at the CRT 3.

Figure 3:
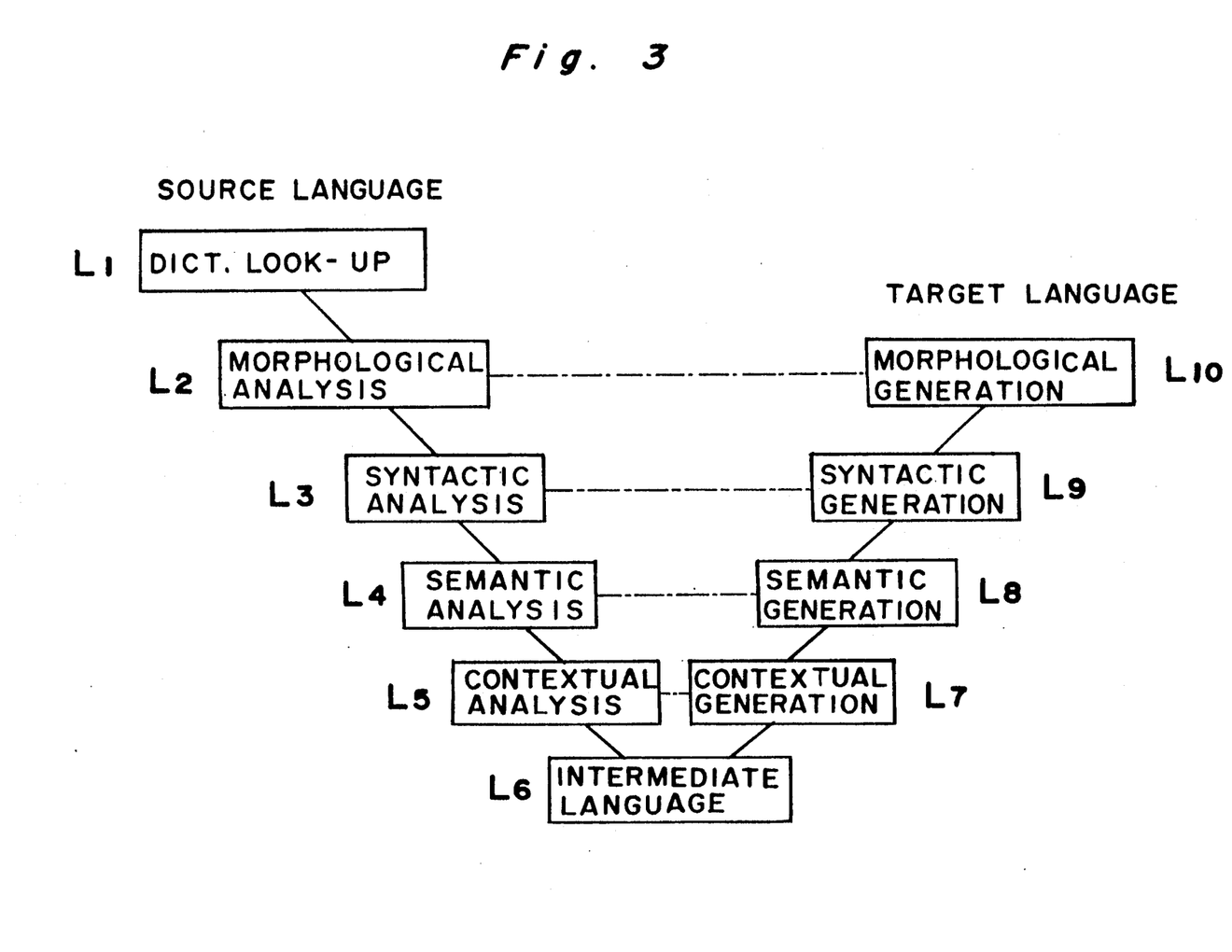
FIG. 3 is a view explanatory of translation levels in automatic translation.

Generally, automatic translation performed in the translation module 5 has analytic levels shown in FIG. 3. When the source language is inputted at a left upper portion of FIG. 3, analysis is performed in the order of dictionary look-up at level L1, morphological analysis at level L2, syntactic analysis at level L3, semantic analysis at level L4 and contextual analysis at level L5.

Machine translation is roughly classified into a pivot type and a transfer type according to the analytic levels. In the pivot type, analysis is performed up to a concept (called an "intermediate language") at level L6 belonging to neither the source language nor the target language and then, contextual generation at level L7, semantic generation at level L8, syntactic generation at level L9 and morphological generation at level L10 are sequentially performed so as to produce the target language In the transfer type, analysis is performed up to any one of morphological analysis at level L2, syntactic analysis at level L3, semantic analysis at level L4 and contextual analysis at level L5 so as to obtain internal structure of the source language. Subsequently, after the internal structure of the source language has been converted into an internal structure of the target language, which has a level identical with that of the internal structure of the source language, the target language is generated.

Hereinbelow, each analysis is described.

DICTIONARY LOOK-UP AND MORPHOLOGICAL ANALYSIS

The dictionary of the memory 6 shown in FIG. 2 is looked up and the inputted sentence is divided into a morphological sequence (word-string). Grammatical data of each word such as parts of speech and a translated word of each word are obtained and further, tense, person, number, etc. of each word are analyzed.

SYNTACTIC ANALYSIS

As will be described later, sentence structure (structural analysis tree) such as modificatory relations among the words is determined.

SEMANTIC ANALYSIS

From a plurality of results of syntactic analysis, proper meanings and improper meanings are discriminated from each other.

CONTEXTUAL ANALYSIS

A topic is grasped and abbreviations or ambiguities are removed.

Figure 4:
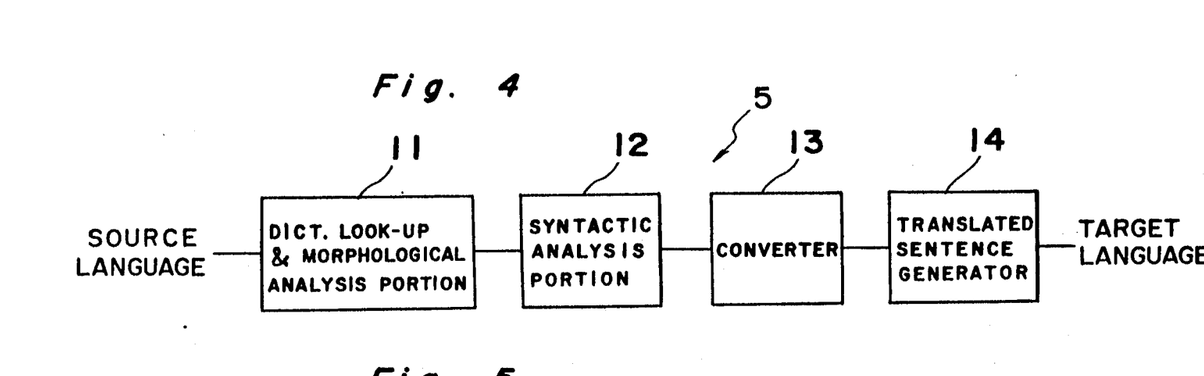
FIG. 4 is a view showing functional structures of a translation module of the copying apparatus of FIG. 2.

It is to be noted that the translation module 5 employed in the present invention performs analysis up to at least syntactic analysis at level L3. Namely, as shown in FIG. 4, the translation module 5 in the this embodiment is constituted by a dictionary look-up and morphological analysis portion 11, a syntactic analysis portion 12, a converter 13 and a translated sentence generator 14.

Figure 5:
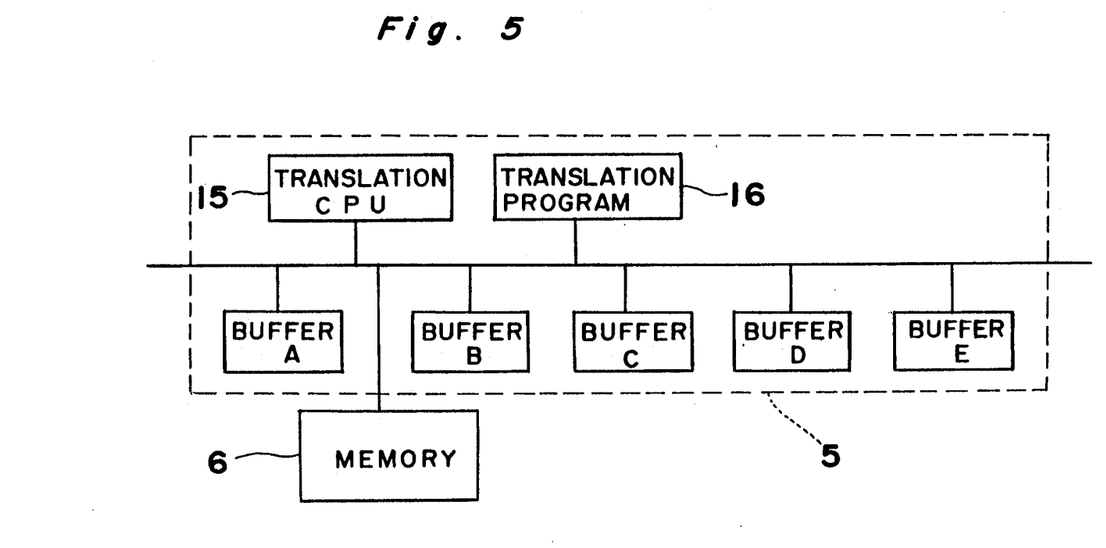
FIG. 5 is a block diagram of the translation module of FIG. 4.

FIG. 5 is a block diagram showing the translation module 5. Meanwhile, FIGS. 6 to 10 show one example of contents of buffers A to E of FIG. 5 in the case where an English sentence "This is a pen." is translated into Japanese by the translating apparatus K.

Figure 6:
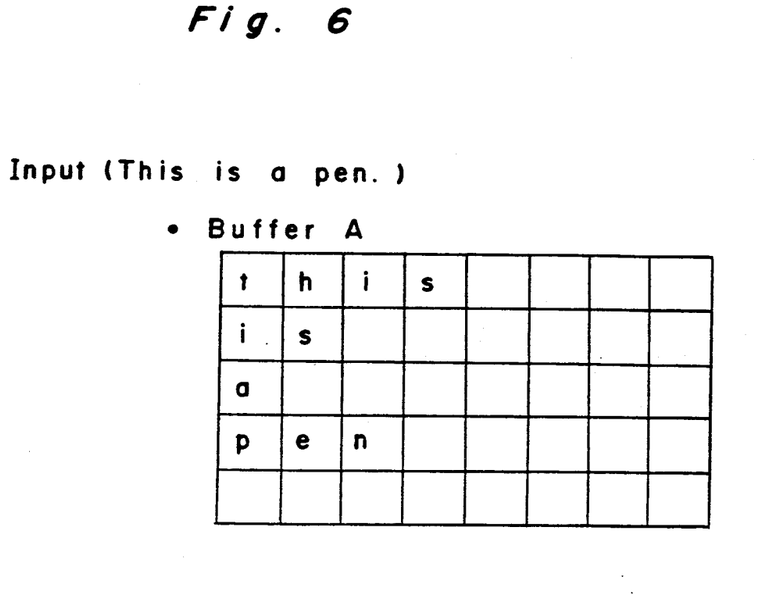
FIGS. 6 to 10 are views showing an example of contents of buffers of the translation module of FIG. 5.
Figure 7:
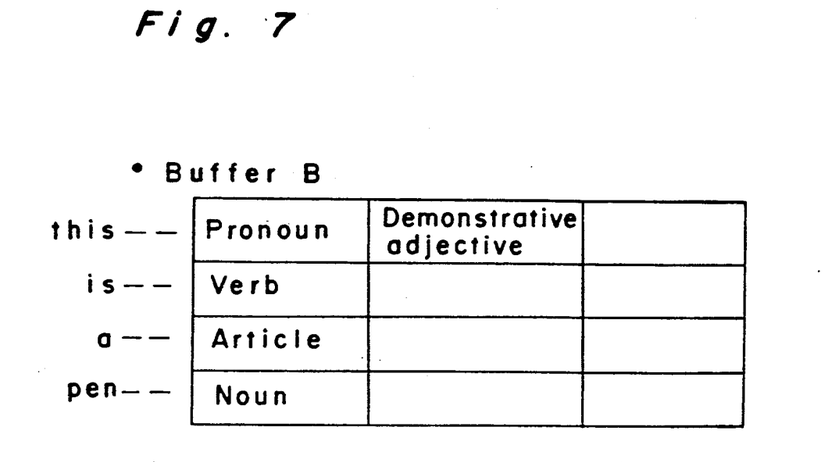
Figure 8:
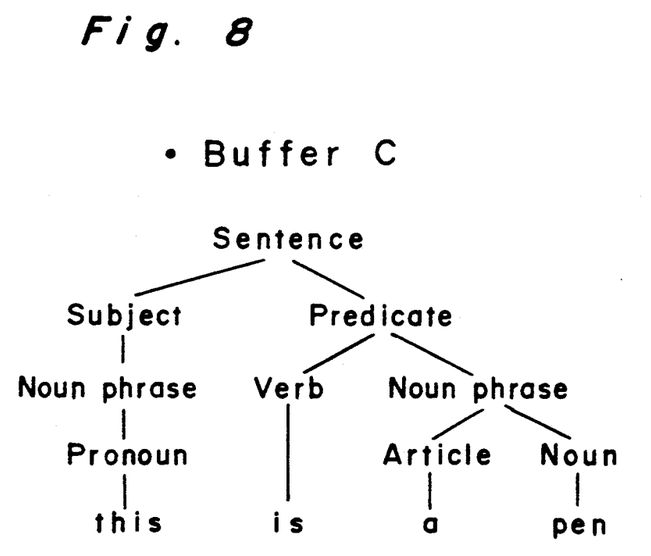

Hereinbelow, operations of English-Japanese translation of the translating apparatus K are described with reference to FIGS. 4 to 10. As shown in FIG. 6, the read original sentence is stored in the buffer A of FIG. 5. Under control of a translation CPU 15 based on a translation program 16, necessary data of each word such as a translated word are obtained with the use of the dictionary of the memory 6 by the dictionary look-up and morphological analysis portion 11 of FIG. 4 in accordance with the original sentence stored in the buffer A and are stored in the buffer B of FIG. 5. Among the necessary data, for example, data on parts of speech of each word are stored as shown in FIG. 7. At this time, although the word "this" has plural parts of speech, one part of speech is uniquely determined by the syntactic analysis portion 12 of FIG. 4. In the syntactic analysis portion 12, a structure analytic tree showing modificatory relations among the words is determined in accordance with the dictionary and the grammatical rules of the memory 6 as shown in FIG. 8 and is stored in the buffer C of FIG. 5. This structure analytic tree is determined as follows. Namely, from the grammatical rules of the memory 6, the following rules (1) to (5) are obtained.

(1) Sentence→subject, predicate
(2) Subject→noun phrase
(3) Predicate→verb, noun phrase
(4) Noun phrase→pronoun
(5) Noun phrase→article, noun For example, the rule (1) represents that "A sentence is composed of a subject and a predicate." The structure analytic tree is determined in accordance with these rules (1) to (5).

Figure 9:
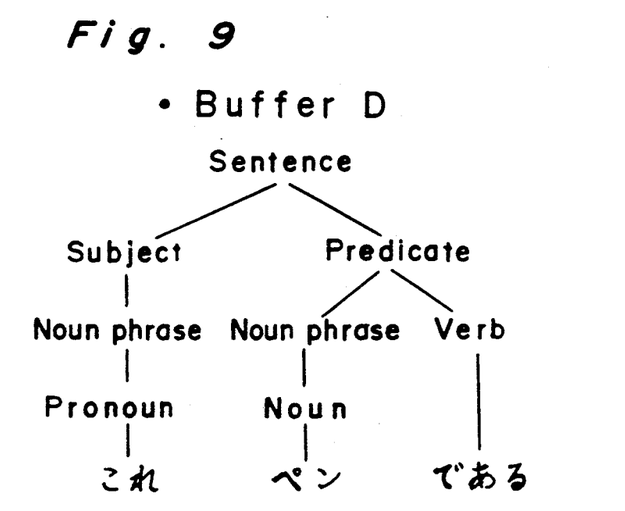
Figure 10:
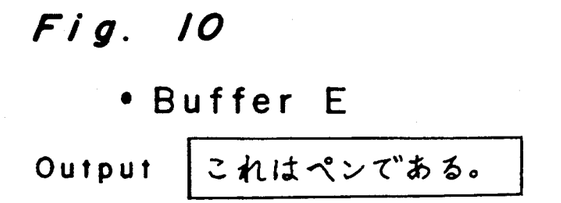

In the converter 13 of FIG. 4, structure of the structure analytic tree (FIG. 8) for the inputted English sentence is converted into a structure of the Japanese sentence as shown in FIG. 9 by using the tree structure conversion rules of the memory 6 in the same manner as in the above described syntactic analysis portion 12. The obtained result is stored in the buffer D of FIG. 5. In the translated sentence generator 14, a proper particle " " or an adverb is added to the obtained incomplete Japanese " " so as to obtain a complete Japanese sentence " " such that the complete Japanese sentence is stored in the buffer E of FIG. 5. This complete Japanese sentence is outputted from the translation module 5 so as to be not only stored in the main memory 2 but displayed at the CRT 3.

Figure 14:
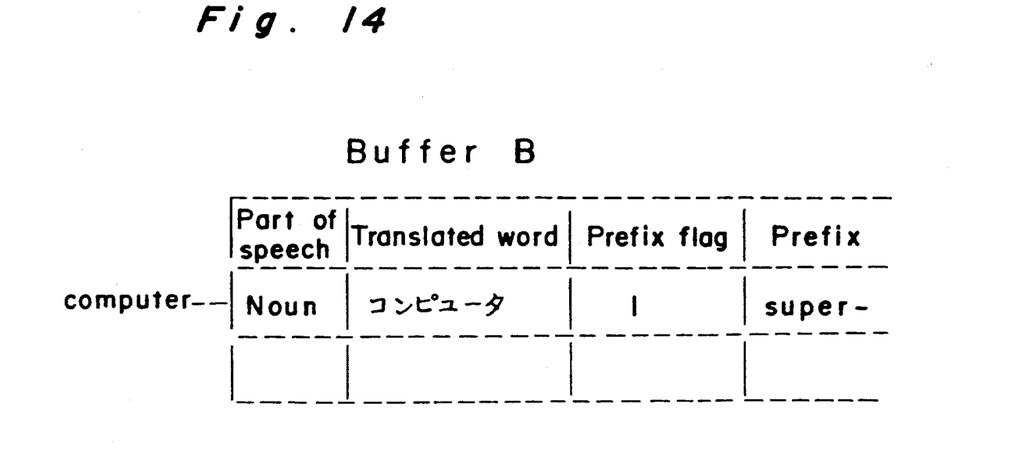
FIG. 14 is view showing another example of contents of the buffer of FIG. 7.

At this time, in the case where a source language including a basic word combined with a prefix has been inputted, the basic word combined with the prefix is translated by the translated sentence generator 14 of FIG. 4 as follows. Generation of a translated sentence is described with reference to a flow chart of FIG. 12. It should be noted in this embodiment that Japanese characters are divided into square Japanese letters ("katakana" in Japanese) and Chinese characters ("kanji" in Japanese). At this time, if the basic word combined with the prefix has been inputted, the dictionary look-up and morphological analysis portion 11 does not translate the prefix and stores in the buffer B, information indicating that the basic word is combined with the prefix by adding this information to a translated word of the basic word. At step S1, it is judged based on results of dictionary look-up of the dictionary look-up and morphological analysis portion 11 by referring to the buffer B whether or not one of the inputted words (morphemes) is the basic word combined with the prefix. More specifically, in the case where the basic word combined with the prefix is "supercomputer", the basic word is "computer" and the prefix is "super-" and a portion of contents of the buffer B is illustrated a shown in FIG. 14. Thus, a decision is made at step S1 whether or not a prefix flag indicative of the basic word combined with the prefix is 1. In the case of "YES" at step S1, the program flow proceeds to step S2. On the contrary, in the case of "NO" at step S1, the program flow proceeds to step S7. In the case of the "supercomputer", a decision of "YES" is made at step S1 and thus, the program flow proceeds to step S2. At step S2, the translated word of the basic word is scanned such that it is judged whether or not the translated word of the basic word is wholly composed of square Japanese letters ("katakana" in Japanese). In the case of the "supercomputer", a decision is made as to whether or not the translated word " " of the basic word "computer" is wholly composed of square Japanese letters by referring to a column of the translated word of the basic word "computer" of FIG. 14 and thus, a decision of "YES" is made at step S2. In the case of "YES" at step S2, the program flow proceeds to step S3. On the other hand, in the case of "NO" at step S3, the program flow proceeds to step S4.

Figure 11:
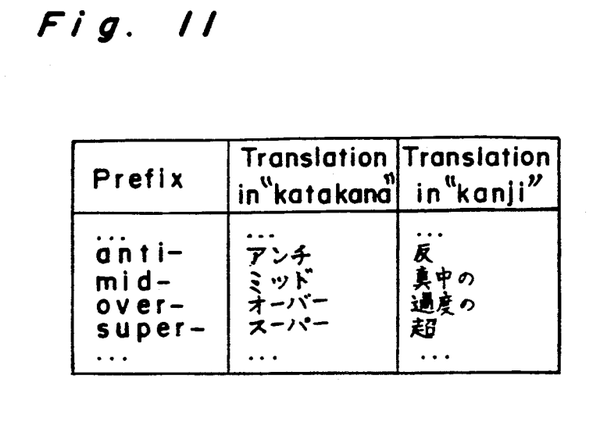
FIG. 11 is a view showing an example of contents of a prefix table employed in the translating apparatus of FIG. 2.

As shown in FIG. 11, a prefix table registered in the dictionary of FIG. 2 contains English prefixes and their two Japanese translated words of each of the prefixes. Namely, one Japanese translated word of each prefix is composed of square Japanese letters ("katakana" in Japanese), while the other is composed of Chinese characters ("kanji" in Japanese). At step S3, the corresponding translated word in square Japanese letters is selected from the prefix table and is generated for the prefix. In the case of the "supercomputer", the translated word " " in square Japanese letters is generated for the prefix "super-" at step S3. On the other hand, at step S4, the corresponding translated word in Chinese characters is selected from the prefix table and is generated for the prefix.

Namely, in the case where the translated word of the basic word to be combined with the prefix is composed of square Japanese letters, the prefix is also translated in square Japanese letters. On the other hand, in the case where the translated word of the basic word to be combined with the prefix is composed of Chinese characters, the prefix is also translated in Chinese characters. As a result, it becomes possible to obtain a natural translated sentence including a combined word consisting of the basic word and the prefix.

Figure 12:
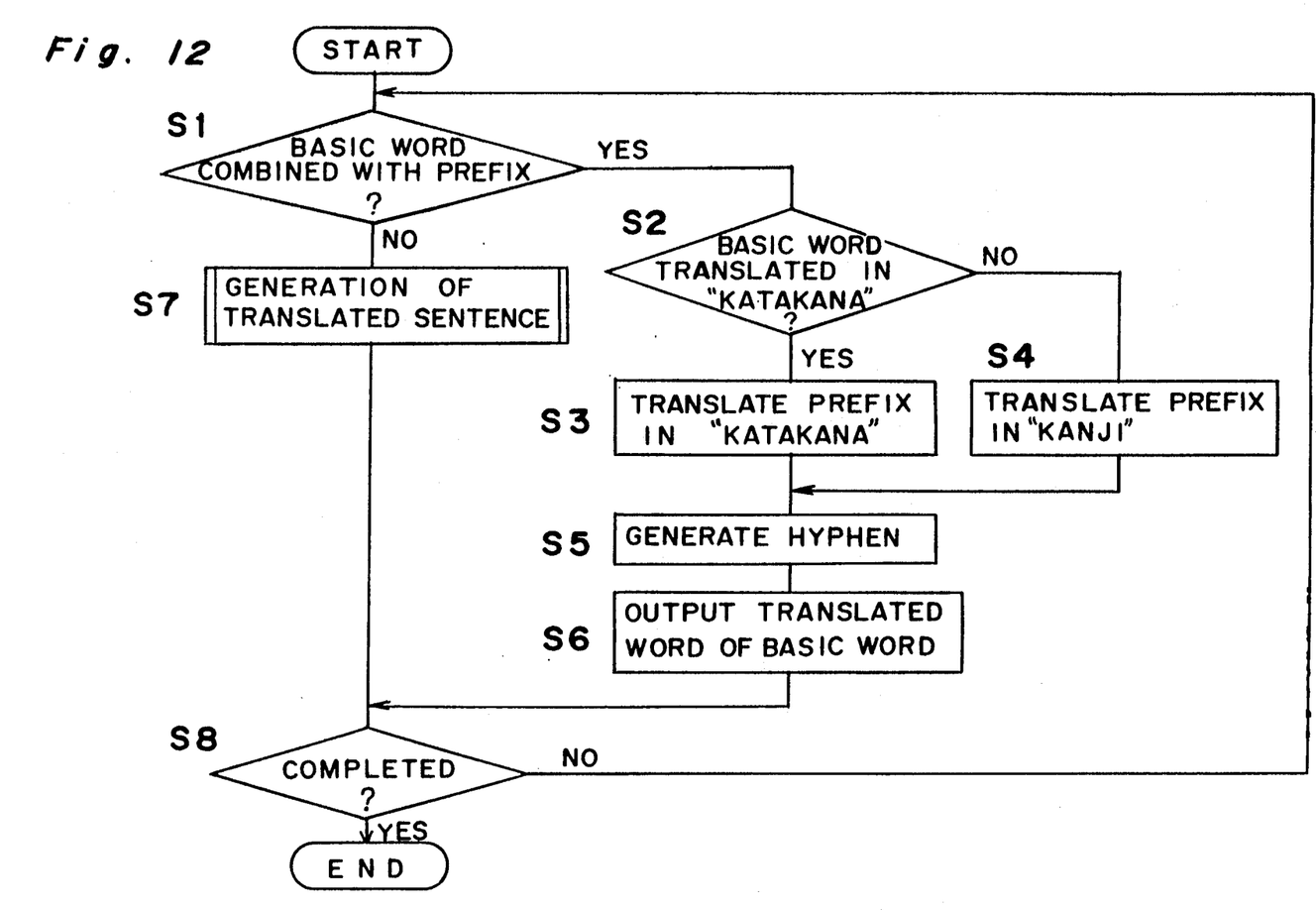
FIG. 12 is a flow chart showing sequences of translation of the translating apparatus of FIG. 2.

At step S5, a hyphen (-) is generated so as to follow the translated word of the prefix generated at step S3 or S4. In the case of the "supercomputer", the hyphen is added to the translated word "         " of the prefix "super-" so as to obtain a word "         ".

Figure 13:
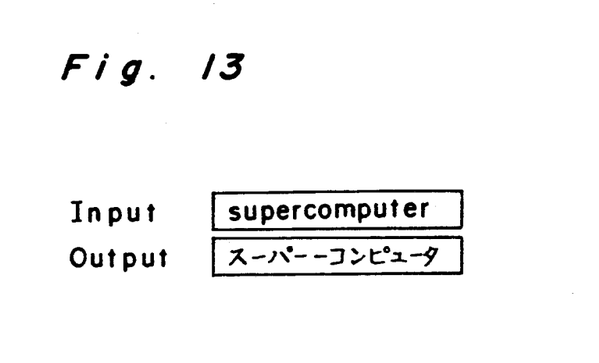
FIG. 13 is a view showing an example of an input sentence and an output sentence (translated sentence) in the translating apparatus of FIG. 2.

Subsequently, at step S6, the translated word of the basic word is outputted and thus, the translated word of the combined word consisting of the basic word and the prefix is obtained in which the hyphen is inserted between the translated word of the prefix and the translated word of the basic word. In the case of the "supercomputer", a translated word "         " is obtained as shown in FIG. 13 in which the hyphen is inserted in a natural translated sentence "         ", i.e. between the translated word "         " of the prefix "super-" and the translated word "         " of the basic word "computer". By this procedure, if a hyphen exists in the translated sentence, it can be concluded that the word ("         ") before the hyphen is the translated word of the prefix ("super-"), which was obtained by processing of the prefix at steps S1 to S4.

At step S7, since the inputted word is not the basic word combined with the prefix, ordinary processing for generating a translated sentence is performed. Then, at step S8, it is judged whether or not the processing for generating the translated sentence has been completed. In the case of "NO" at step S8, the program flow returns to step S1. On the contrary, in the case of "YES" at step S8, the processing for generating the translated sentence is terminated.

As described above, in this embodiment, in the case where the basic word combined with the prefix exists in the inputted English sentence when the inputted English sentence is translated into the Japanese sentence, the prefix is also translated in square Japanese letters if the translated word of the basic word is composed of square Japanese letters. On the other hand, if the translated word of the basic word is composed of Chinese characters, the prefix is also translated in Chinese characters. Furthermore, the translated sentence is generated by inserting the hyphen between the translated word of the prefix and the translated word of the basic word. Therefore, in translation of the basic word combined with the prefix, the translated word of the prefix and the translated word of the basic word are composed of the characters of the same kind. In other words, the translated word of the combined word consisting of the prefix and the basic word is not composed of combination of Chinese characters and square Japanese letters but is wholly composed of either Chinese characters or square Japanese letters, thereby resulting in natural Japanese translation.

Meanwhile, if the hyphen is present in the translated sentence, it can be judged that the word located immediately before the hyphen is the translated word of the prefix, which has been generated by processing of the prefix, thus resulting in a great convenience in checkup of the translated sentence.

In this embodiment, the hyphen is inserted between the translated word of the prefix and the translated word of the basic word so as to indicate that the word located immediately before the hyphen is the translated word of the prefix, which has been generated by processing of the prefix. However, the present invention is not restricted to this method but may employ other symbols, etc.

Furthermore, the configuration and the contents of each buffer of the translation module 5 of the present invention are not restricted to those of this embodiment.

As is clear from the foregoing description, the translating apparatus of the present invention includes the prefix table, the prefix decision means, the character discriminating means and the prefix translating means. Thus, if it is decided by the prefix decision means that the morpheme of the target language converted from the syntax of the morpheme of the source language is the basic word combined with the prefix, the kind of the characters of the translated word of the basic word is discriminated based on the prefix table by the character discriminating means and the translated word of the prefix is generated by the prefix translating means in the characters of the same kind as that of the characters of the translated word of the basic word. Therefore, in the case where the basic word combined with the prefix is translated, the kind of the characters of the translated word of the basic word can be made identical with that of the translated word of the prefix. Accordingly, it becomes possible to translate the basic word combined with the prefix into natural Japanese.

Furthermore, the translating apparatus of the present invention includes the symbol generating means. Thus when the translated word of the prefix has been generated by the prefix translating means, the symbol indicating that the translated word of the prefix has been generated by the prefix translating means is added to the translated word of the combined word consisting of the basic word and the prefix by the symbol generating means. Therefore, if the translated word having the symbol added thereto exists in the translated sentence, it can be concluded that the translated word is the translated word of the prefix, which has been generated by processing of the prefix, thereby facilitating checkups of the translated sentence.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. In a translating apparatus including a morphological analysis portion for not only dividing an inputted sentence of a source language into morphemes but obtaining translated words of the morphemes by using a dictionary, a syntactic analysis portion for analyzing, by using the dictionary and grammatical rules, structure of a sequence of the morphemes divided by said morphological analysis portion, a converter for converting the structure of the inputted sentence obtained by said syntactic analysis portion into a structure of a translated sentence of a target language and translated sentence generator for generating the translated sentence in accordance with the structure of the translated sentence obtained by said converter, the improvement comprising:

a prefix table for storing a prefix and a plurality of translated words of the prefix such that the translated words of the prefix are, respectively, composed of different kinds of characters of the target language;

a prefix decision means for deciding whether or not one of the morphemes obtained by said morphological analysis portion is a basic word combined with the prefix;

a character discriminating means for discriminating, in the case where it has been decided by said prefix decision means that the one of the morphemes obtained by said morphological analysis portion is the basic word combined with the prefix, a kind of characters of a translated word of the basic word; and a prefix translating means for generating one of the translated words of the prefix from said prefix table such that the one of the translated words of the prefix is composed of characters of the same kind as that of the characters of the translated word of the basic word, which has been discriminated by said character discriminating means.

2. A translating apparatus as claimed in claim 1, further comprising:

a symbol generating means for generating, in the case where the one of the translated words of the prefix has been generated by said prefix translating means, a symbol indicating that the one of the translated words of the prefix has been generated by said prefix translating means, so as to add the symbol to a translated word of a combined word consisting of the basic word and the prefix.

* * * * *